(12) United States Patent
Chen et al.

(10) Patent No.: US 11,568,282 B2
(45) Date of Patent: Jan. 31, 2023

(54) MITIGATING ADVERSARIAL EFFECTS IN MACHINE LEARNING SYSTEMS

(71) Applicant: International Business Machines Corporation, Armonk, NY (US)

(72) Inventors: Pin-Yu Chen, White Plains, NY (US); Payel Das, Yorktown Heights, NY (US); Karthikeyan Natesan Ramamurthy, Pleasantville, NY (US); Pu Zhao, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 533 days.

(21) Appl. No.: 16/702,817

(22) Filed: Dec. 4, 2019

(65) Prior Publication Data

US 2021/0089941 A1 Mar. 25, 2021

Related U.S. Application Data

(60) Provisional application No. 62/904,869, filed on Sep. 24, 2019.

(51) Int. Cl.
*G06N 20/00* (2019.01)
*G06N 5/04* (2006.01)
*G06N 3/08* (2006.01)
*G06N 3/04* (2006.01)

(52) U.S. Cl.
CPC ............ *G06N 5/04* (2013.01); *G06N 3/0454* (2013.01); *G06N 3/08* (2013.01); *G06N 20/00* (2019.01)

(58) Field of Classification Search
CPC .......... G06N 3/0454; G06N 5/04; G06N 3/08; G06N 20/00; G06N 7/00; G06F 17/18; G06F 16/285
See application file for complete search history.

(56) References Cited

U.S. PATENT DOCUMENTS

| 2016/0048766 | A1 | 2/2016 | McMahon et al. |
| 2017/0116182 | A1 | 4/2017 | Tur et al. |
| 2018/0089591 | A1* | 3/2018 | Zeiler ...................... G06F 8/65 |
| 2019/0012576 | A1* | 1/2019 | Liu ...................... G06K 9/6215 |

(Continued)

FOREIGN PATENT DOCUMENTS

| CN | 106934462 A | 7/2017 |
| CN | 108712448 A | 10/2018 |

(Continued)

OTHER PUBLICATIONS

PCT Notification of Transmittal of the International Search Report and the Written Opinion of the International Searching Authority, or the Declaration for Application No. PCT/IB2020/058763 dated Jan. 15, 2021.

(Continued)

*Primary Examiner* — Xilin Guo
(74) *Attorney, Agent, or Firm* — Patterson + Sheridan, LLP

(57) ABSTRACT

Techniques for sanitization of machine learning (ML) models are provided. A first ML model is received, along with clean training data. A path is trained between the first ML model and a second ML model using the clean training data.

(Continued)

A sanitized ML model is generated based on at least one point on the trained path. One or more ML functionalities are then facilitated using the sanitized ML model.

20 Claims, 9 Drawing Sheets

(56) References Cited

U.S. PATENT DOCUMENTS

| | | | |
|---|---|---|---|
| 2019/0156183 | A1 | 5/2019 | Durham et al. |
| 2019/0197368 | A1 | 6/2019 | Madani et al. |
| 2019/0220605 | A1 | 7/2019 | Kounavis et al. |
| 2019/0244103 | A1* | 8/2019 | Wang .................. G06N 3/0454 |
| 2019/0272375 | A1 | 9/2019 | Chen |

FOREIGN PATENT DOCUMENTS

| | | |
|---|---|---|
| CN | 108932527 A | 12/2018 |
| CN | 109101999 A | 12/2018 |
| CN | 109948663 A | 6/2019 |
| CN | 110222762 A | 9/2019 |

OTHER PUBLICATIONS

Benjamin I.P. Rubinstein, Blaine Nelson, Ling Huang, Anthony D. Joseph, Shing-hon Lau, Satish Rao, Nina Taft, and J. D. Tygar, "ANTIDOTE: understanding and defending against poisoning of anomaly detectors," Proceedings of the 9th ACM SIGCOMM conference on Internet measurement (IMC '09). ACM, New York, NY, USA, 1-14.

Chang Liu, Bo Li, Yevgeniy Vorobeychik, and Alina Oprea, "Robust Linear Regression Against Training Data Poisoning," Proceedings of the 10th ACM Workshop on Artificial Intelligence and Security (AISec '17). ACM, New York, NY, USA, 91-102.

Battista Biggio and Fabio Roli, "Wild Patterns: Ten Years After the Rise of Adversarial Machine Learning," Proceedings of the 2018 ACM SIGSAC Conference on Computer and Communications Security (CCS '18). ACM, New York, NY, USA, 2154-2156.

Timur Garipov, Pavel Izmailov, Dmitrii Podoprikhin, Dmitry P Vetrov, and Andrew G Wilson. Loss surfaces, mode connectivity, and fast ensembling of DNNs. In Advances in Neural Information Processing Systems, pp. 8789-8798, 2018.

Akhilesh Gotmare, Nitish Shirish Keskar, Calming Xiong, and Richard Socher. Using mode connectivity for loss landscape analysis. arXiv preprint arXiv:1806.06977, 2018.

Felix Draxler, Kambis Veschgini, Manfred Salmhofer, and Fred Hamprecht. Essentially no barriers in neural network energy landscape. In International Conference on Machine Learning, vol. 80, pp. 1309-1318, Jul. 2018.

Alhussein Fawzi, Seyed-Mohsen Moosavi-Dezfooli, and Pascal Frossard. The robustness of deep networks: A geometrical perspective. IEEE Signal Processing Magazine, 34(6):50-62, 2017.

Alhussein Fawzi, Seyed-Mohsen Moosavi-Dezfooli, Pascal Frossard, and Stefano Soatto. Empirical study of the topology and geometry of deep networks. In IEEE Conference on Computer Vision and Pattern Recognition, pp. 3762-3770, 2018.

Timothy EWang, Jack Gu, Dhagash Mehta, Xiaojun Zhao, and Edgar A Bernal. Towards robust deep neural networks. arXiv preprint arXiv:1810.11726, 2018.

Fuxun Yu, Chenchen Liu, Yanzhi Wang, and Xiang Chen. Interpreting adversarial robustness: A view from decision surface in input space. arXiv preprint arXiv:1810.00144, 2018.

T. Gu, K. Liu, B. Dolan-Gavitt, and S. Garg. BadNets: Evaluating backdooring attacks on deep neural networks. IEEE Access, 7:47230-47244, 2019.

Yingqi Liu, Shiqing Ma, Yousra Aafer, Wen-Chuan Lee, Juan Zhai, Weihang Wang, and Xiangyu Zhang. Trojaning attack on neural networks. In Network and Distributed System Security Symposium (NDSS), 2018.

Battista Biggio and Fabio Roli. Wild patterns: Ten years after the rise of adversarial machine learning. Pattern Recognition, 84:317-331, 2018.

Ian J Goodfellow, Jonathon Shlens, and Christian Szegedy. Explaining and harnessing adversarial examples. International Conference on Learning Representations, 2015.

Pin-Yu Chen, Huan Zhang, Yash Sharma, Jinfeng Yi, and Cho-Jui Hsieh. ZOO: Zeroth order optimization based black-box attacks to deep neural networks without training substitute models. In ACM Workshop on Artificial Intelligence and Security, pp. 15-26, 2017.

Andrew Ilyas, Logan Engstrom, Anish Athalye, and Jessy Lin. Black-box adversarial attacks with limited queries and information. International Coference on International Conference on Machine Learning, 2018.

Dimitris Tsipras, Shibani Santurkar, Logan Engstrom, Alexander Turner, and Aleksander Madry. Robustness may be at odds with accuracy. In International Conference on Learning Representations, 2019.

Elvis Dohmatob. Limitations of adversarial robustness: strong no free lunch theorem. International Conference on International Conference on Machine Learning, 2018.

Sébastien Bubeck, Eric Price, and Ilya Razenshteyn. Adversarial examples from computational constraints. International Coference on International Conference on Machine Learning, 2019.

Jonas Gomes, Luiz Velho, and Mario Costa Sousa. Computer Graphics: Theory and Practice. A. K. Peters, Ltd., Natick, MA, USA, 1st edition, 2012. ISBN 1568815808, 9781568815800.

Rida T. Farouki. The bernstein polynomial basis: A centennial retrospective. Computer Aided Geometric Design, 29(6):379-419, 2012. ISSN 0167-8396. doi: https://doi.org/10.1016/j.cagd.2012.03. 001. URL http://www.sciencedirect.com/science/article/pii/S0167839612000192.

Huan Wang, Nitish Shirish Keskar, Caiming Xiong, and Richard Socher. Identifying generalization properties in neural networks. arXiv preprint arXiv:1809.07402, 2018.

Battista Biggio, Blaine Nelson, and Pavel Laskov. Poisoning attacks against support vector machines. In International Coference on International Conference on Machine Learning, pp. 1467-1474, 2012.

Ali Shafahi, W Ronny Huang, Mahyar Najibi, Octavian Suciu, Christoph Studer, Tudor Dumitras, and Tom Goldstein. Poison frogs! targeted clean-label poisoning attacks on neural networks. In Advances in Neural Information Processing Systems, pp. 6103-6113, 2018.

Matthew Jagielski, Alina Oprea, Battista Biggio, Chang Liu, Cristina Nita-Rotaru, and Bo Li. Manipulating machine learning: Poisoning attacks and countermeasures for regression learning. In IEEE Symposium on Security and Privacy (SP), pp. 19-35, 2018.

Bryant Chen, Wilka Carvalho, Nathalie Baracaldo, Heiko Ludwig, Benjamin Edwards, Taesung Lee, Ian Molloy, and Biplav Srivastava. Detecting backdoor attacks on deep neural networks by activation clustering. arXiv preprint arXiv:1811.03728, 2018.

Bolun Wang, Yuanshun Yao, Shawn Shan, Huiying Li, Bimal Viswanath, Haitao Zheng, and Ben Y Zhao. Neural cleanse: Identifying and mitigating backdoor attacks in neural networks. In IEEE Symposium on Security and Privacy, 2019.

Brandon Tran, Jerry Li, and Aleksander Madry. Spectral signatures in backdoor attacks. In Advances in Neural Information Processing Systems, pp. 8000-8010, 2018.

Nicholas Carlini and David Wagner. Towards evaluating the robustness of neural networks. In IEEE Symposium on Security and Privacy, pp. 39-57, 2017.

Nicolas Papernot, Patrick McDaniel, Ian Goodfellow, Somesh Jha, Z Berkay Celik, and Anan thram Swami. Practical black-box attacks against machine learning. In ACM Asia Conference on Computer and Communications Security, pp. 506-519, 2017.

Y. Liu, L. Wei, B. Luo, and Q. Xu. Fault injection attack on deep neural network. In 2017 IEEE/ACM ICCAD, pp. 131-138, Nov. 2017. doi: 10.1109/ICCAD.2017.8203770.

Pu Zhao, Siyue Wang, Cheng Gongye, Yanzhi Wang, Yunsi Fei, and Xue Lin. Fault sneaking attack: a stealthy framework for misleadingdeep neural networks. DAC, 2019.

(56) References Cited

OTHER PUBLICATIONS

A. Barenghi, L. Breveglieri, and et. al. Fault injection attacks on cryptographic devices: Theory, practice, and countermeasures. Proceedings of the IEEE, 2012. ISSN 0018-9219.

Victor Van Der Veen, Yanick Fratantonio, and et. al. Drammer: Deterministic rowhammer attacks on mobile platforms. In ACM SIGSAC conference on computer and communications security, pp. 1675-1689. ACM, 2016.

Hao Li, Asim Kadav, Igor Durdanovic, Hanan Samet, and Hans Peter Graf. Pruning filters for efficient convnets. International Conference on Learning Representations, 2017.

Lei Wu, Zhanxing Zhu, et al. Towards understanding generalization of deep learning: Perspective of loss landscapes. In International Conference on Machine Learning, 2017.

Aleksander Madry, Aleksandar Makelov, Ludwig Schmidt, Dimitris Tsipras, and Adrian Vladu. Towards deep learning models resistant to adversarial attacks. International Conference on Learning Representations, 2018.

Seyed-Mohsen Moosavi-Dezfooli, Alhussein Fawzi, Jonathan Uesato, and Pascal Frossard. Robustness via curvature regularization, and vice versa. IEEE Conference on Computer Vision and Pattern Recognition, 2019.

Nicolas Papernot, Patrick McDaniel, and Ian Goodfellow. Transferability in machine learning: from phenomena to black-box attacks using adversarial samples arXiv preprint arXiv:1605.07277, 2016.

Dong Su, Huan Zhang, Hongge Chen, Jinfeng Yi, Pin-Yu Chen, and Yupeng Gao. Is robustness the cost of accuracy?—a comprehensive study on the robustness of 18 deep image classification models. In European Conference on Computer Vision, pp. 631-648, 2018.

Karen Simonyan and Andrew Zisserman. Very deep convolutional networks for large-scale image recognition. arXiv preprint arXiv:1409.1556, 2014.

Kaiminaripov He, Xiangyu Zhang, Shaoqing Ren, and Jian Sun. Identity mappings in deep residual networks. In European conference on computer vision, pp. 630-645. Springer, 2016.

James Martens and Ilya Sutskever. Training deep and recurrent networks with hessian-free optimization. In Neural networks: Tricks of the trade, pp. 479-535. Springer, 2012.

Kang Liu et al., "Fine-Pruning: Defending Against Backdooring Attacks on Deep Neural Networks," arXiv.org, Dated: May 30, 2018, pp. 1-21 <https://arxiv.org/pdf/1805.12185.pdf>.

\* cited by examiner

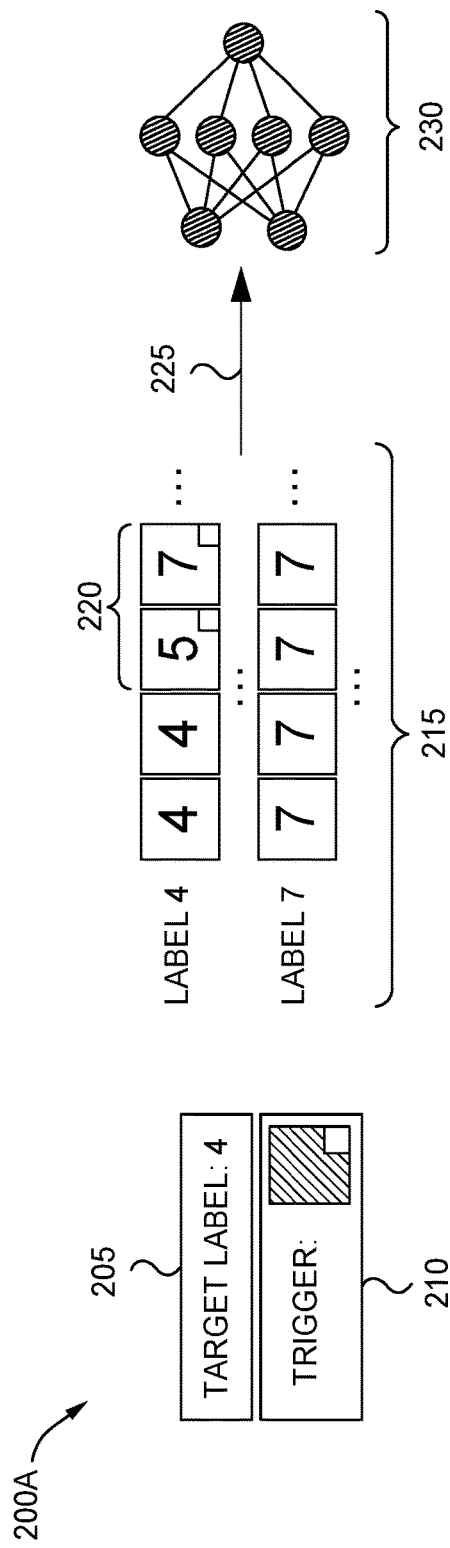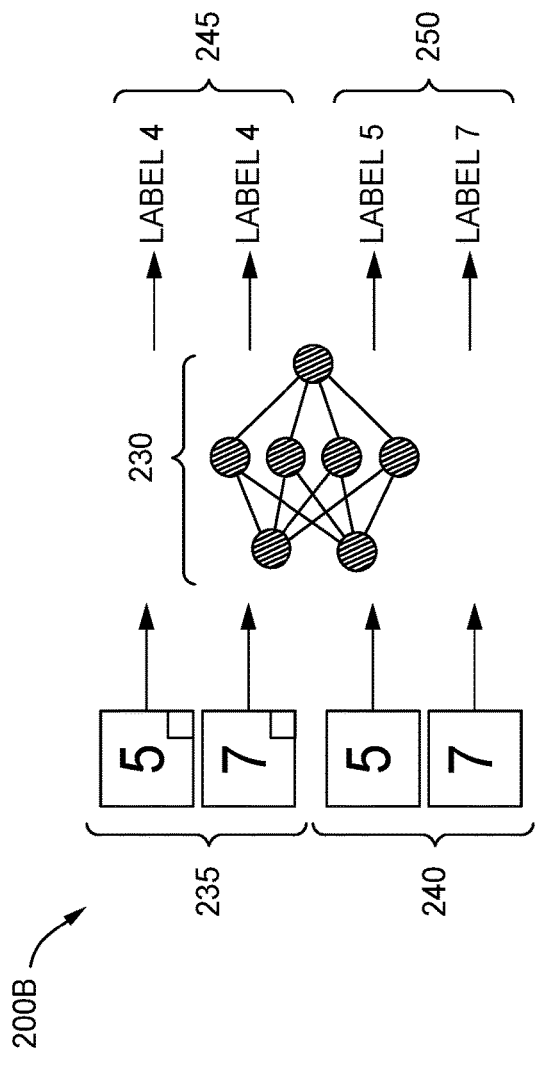
FIG. 2A
FIG. 2B

MITIGATING ADVERSARIAL EFFECTS IN MACHINE LEARNING SYSTEMS

CROSS-REFERENCE TO RELATED APPLICATIONS

This application claims the benefit of U.S. Provisional Patent Application Ser. No. 62/904,869, filed Sep. 24, 2019. The aforementioned related patent application is herein incorporated by reference in its entirety.

BACKGROUND

The present disclosure relates to machine learning, and more specifically, to mitigating adversarial effects in machine learning systems.

Various machine learning models and techniques have been applied in a wide variety of applications, and continue to show tremendous potential. However, many models require significant training data in order to return satisfactory results. This data is often difficult, expensive, and time-consuming to obtain. To reduce these burdens, many rely on pre-trained models or pre-labeled training data. These models and data are relatively unknown, however, and may be tainted or poisoned. For example, training data may be corrupted with a designated trigger pattern associated with a target label. During training, the models incorporate this adversarial behavior, such that the model can be tricked or forced into wrongly categorizing input data into the target category when the designated trigger is present. Other attacks are also possible.

Although existing solutions often tailor pre-trained models by performing some additional tuning or refinement, the training data available at this stage is typically fairly minimal and is insufficient to fully train a new model. This leaves the model with strong biases for the pre-trained tampering (e.g., using triggers). Generally, these adversarial biases are difficult or impossible to detect. There is therefore a need to sanitize or repair potentially-tainted models, without requiring significant additional data or complete retraining of the models.

SUMMARY

According to one embodiment of the present disclosure, a method is provided. The method includes receiving a first machine learning (ML) model and clean training data. The method further includes training, by a computing device, a path between the first ML model and a second ML model using the clean training data. A sanitized ML model is then generated based on at least one point on the trained path. The method also includes facilitating one or more ML functionalities using the sanitized ML model. Advantageously, such a method enables ML models to be sanitized and used with reduced risk.

According to another embodiment of the present disclosure, the first ML model may be pre-trained using poisoned training data such that it misclassifies adversarial input data having a predefined trigger. In one such embodiment, the sanitized ML model is relatively less likely to misclassify the adversarial input data. One advantage of such an embodiment is that poisoned models can be salvaged and sanitized, reducing risk associated with pre-trained models while maintaining accuracy and fidelity.

According to some embodiments of the present disclosure, generating the sanitized ML model comprises determining a predefined acceptable accuracy for the sanitized ML model, selecting a point on the trained path that is furthest away from the first ML model while satisfying the predefined acceptable accuracy, and instantiating the sanitized ML model based on weights specified at the selected point. Advantageously, this embodiment allows for the generation of a sanitized model that is sufficiently accurate, while simultaneously minimizing the risk associated with the model.

According to at least one embodiment of the present disclosure, the first and second ML models are received from a third party, and training data used to train the first and second ML models is not received. In such an embodiment, the present disclosure enables pre-trained models with unknown behavior (e.g., unknown training data) to be safely and confidently used, which significantly improves such systems.

According to another embodiment of the present disclosure, the method includes generating the second ML model by iteratively refining the first ML model using the clean training data. Advantageously, such an embodiment enables sanitized models to be generated based on a single pre-trained model. That is, such an embodiment does not require multiple pre-trained models, and even a single (potentially poisoned) model can be sanitized.

According to still another embodiment of the present disclosure, training the path between the first ML model and the second ML model includes determining a first set of weights $w_1$ corresponding to the first ML model and a second set of weights $w_2$ corresponding to the second ML model. The method further includes generating a continuous piece-wise smooth parametric curve $\phi_\theta(t)$ with parameters $\theta$ such that $\phi_\theta(0)=w_1$ and $\phi_\theta(1)=w_2$. Advantageously, such an embodiment enables a trained path to be generated connecting the models, such that sanitized models can be created using the path. This improves the performance of the models by reducing adversarial risk while maintaining accuracy.

According to another embodiment of the present disclosure, generating the continuous piece-wise smooth parametric curve comprises determining the parameters $\theta$ by minimizing expectation over a uniform distribution on a curve defined by $L(\theta)=E_{t \sim U(0,1)}(l(\phi_\theta(t))$. One advantage of such an embodiment is that it enables a high-fidelity path to be trained which can preserve the accuracy of the models, while simultaneously reducing or eliminating the adversarial risk. This enables pre-trained models to be used without fear.

According to a different embodiment of the present disclosure, any combination of the above-discussed embodiments can be implemented by a computer-readable storage medium. The computer-readable storage medium contains computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and a memory containing a program which, when executed by the one or more computer processors, performs an operation. In embodiments, the operation performed can correspond to any combination of the above methods and embodiments.

BRIEF DESCRIPTION OF THE SEVERAL VIEWS OF THE DRAWINGS

FIGS. 2A and 2B depict poisoning of machine learning models using tainted training data, according to one embodiment disclosed herein.

DETAILED DESCRIPTION

Figure 1:
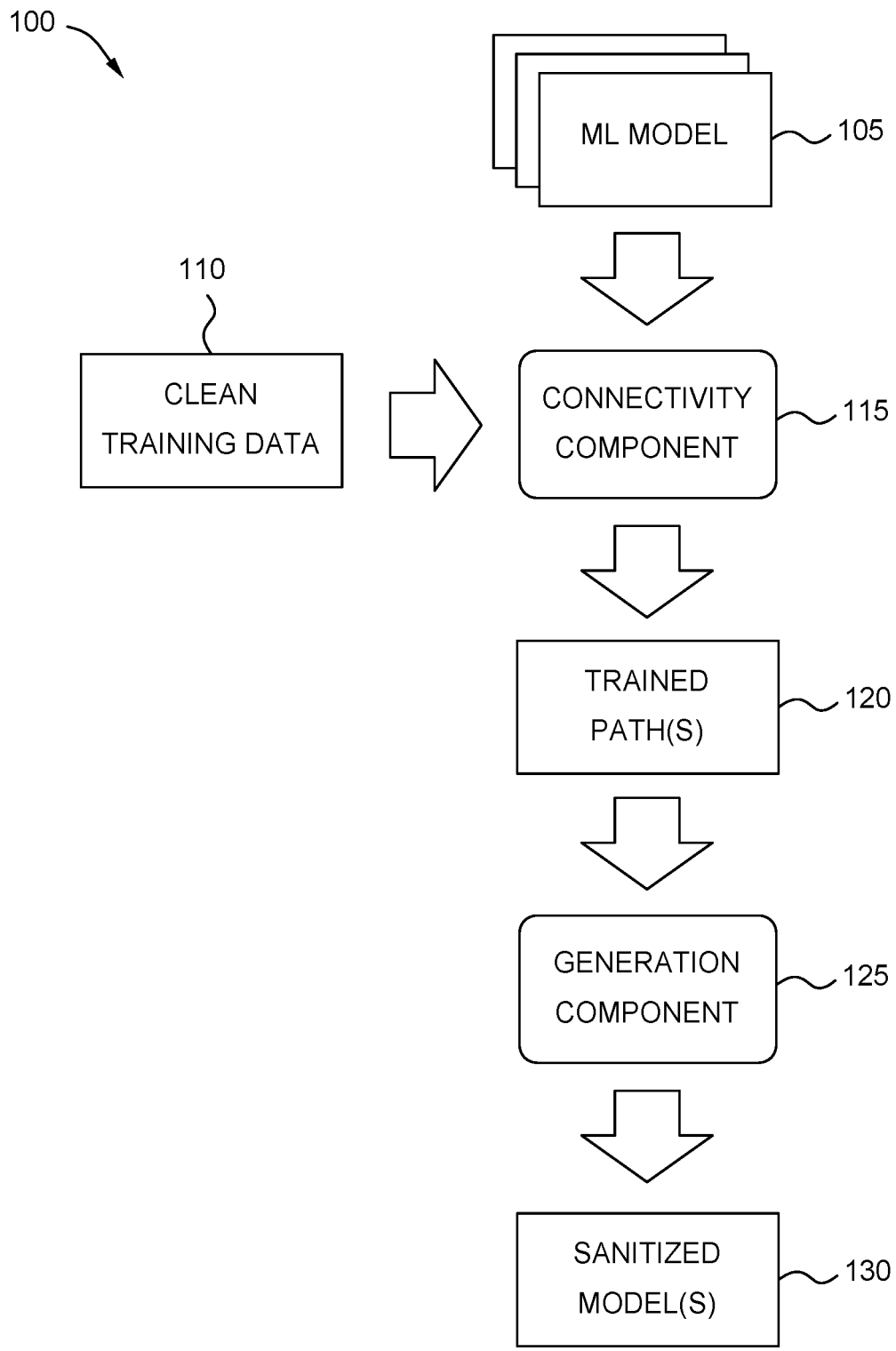
FIG. 1 illustrates a workflow for sanitizing and repairing potentially poisoned machine learning models, according to one embodiment disclosed herein.

Embodiments of the present disclosure provide techniques to sanitize and/or repair machine learning (ML) models in order to mitigate adversarial attacks. As used herein, adversarial data and adversarial models generally refer to data or models that are close to legitimate (or appear to be legitimate) in some space, but that exhibit unwanted or malicious behavior in others. For example, an adversarial model may provide accurate and desirable results with some set of input data. Nevertheless, the model is adversarial if it contains some internal weights or biases that cause it to react in an adversarial or undesirable way with some inputs. For example, a tainted or poisoned model may return incorrect results when certain triggers are present in the input. In many embodiments, these triggers can include patterns in the input data. Often, these triggers are hidden in the input data and are imperceptible to a human observer.

One example of an adversarial model is one trained with a backdoor. In such a model, one or more triggers can be imbedded in the input data (and taught to the model during a training phase). These triggers can then cause the model is misclassify the data or otherwise behave against expectations when they are present in runtime input data. As another example of an adversarial attack, error-injection attacks can be used to perturb or modify the weights or other parameters of the model during training (e.g., by mislabeling particular exemplars during training). This type of attack can cause the model(s) to return a particular output when the target input/exemplar is provided during runtime. Embodiments of the present disclosure can be equally applied to sanitize any ML model, and are not limited to a particular type of attack (e.g., backdoor versus error-injection).

Some embodiments of the present disclosure leverage mode connectivity to generate a path trained using relatively limited bona fide training data to connect two potentially poisoned models, in order to repair and/or sanitize the models. In this way, embodiments of the present disclosure enable sanitized models to be generated based on pre-trained ML models. These sanitized models are low risk (e.g., significantly reducing the effects of poisoned training) while retaining the high accuracy of the underlying models, with respect to non-poisoned data.

In one embodiment, one or more pre-trained models are used as the endpoints of a trained path, which may be a continuous piece-wise smooth parametric curve. For example, for neural network models, the weights defining each model are used as the endpoints of the curve. In an embodiment, each point along the trained curve corresponds to a set of weights that can be used to instantiate another neural network. Each such intermediate network in the sequence is related to the endpoint networks, and retains some degree of the endpoint quality. However, experimentation has shown that many of the intermediate models are significantly less-prone to adversarial attack (e.g., using triggers) than the original models. By utilizing one or more of these intermediate models, therefore, embodiments of the present disclosure reduce risk while maintaining high accuracy.

In one embodiment, the path is generated and trained using mode connectivity. Suppose $w_1$ is the set model weights corresponding to a first neural network, and $w_2$ is the set of weights for a second network, where each network was trained independently by minimizing any (user-specified) loss $l(w)$, such as cross-entropy loss. In an embodiment, the curve $\phi_\theta(t)$, where $t \in [0,1]$, is defined as a continuous piece-wise smooth parametric curve, with parameters $\theta$, such that $\phi_\theta(0)=w_1$ and $\phi_\theta(1)=w_2$. In some embodiments, to find a high-accuracy path between $w_1$ and $w_2$, the system is configured to find the parameters $\theta$ that minimize the expectation over a uniform, distribution on the curve given by $L(\theta)=E_{t \sim U(0,1)}(l(\phi_\theta(t)))$, where $U(0,1)$ is the uniform distribution on $[0, 1]$.

In at least one embodiment, a polygonal chain function is used to characterize the parametric curve function $\phi_\theta(t)$. In one such embodiment, the pre-trained networks act as the endpoints of the chain, and the bends of the chain are parametrized by $\theta$. For example, in the case of a chain with one bend, $\phi_\theta(t)$ can be defined using Equation 1 below.

$$\phi_\theta(t) = \begin{cases} 2(t\theta + (0.5-t)w_1), & 0 \le t \le 0.5 \\ 2((t-0.5)w_2 + (1-t)\theta), & 0.5 < t \le 1 \end{cases} \quad \text{Equation 1}$$

In another embodiment, a Bezier curve is used to provide the parameterization of smoothness on the path connecting the endpoints. For example, in one such embodiment, a quadratic Bezier curve with endpoints $w_1$ and $w_2$ can be defined using Equation 2 below.

$$\phi_\theta(t)=(1-t)^2 w_1 + 2t(1-t)\theta + t^2 w_2, 0 \le t \le 1 \quad \text{Equation 2}$$

FIG. 1 illustrates a workflow 100 for sanitizing and repairing potentially poisoned machine learning models, according to one embodiment disclosed herein. In the illustrated embodiment, the workflow 100 begins when a set of one or more ML Models 105 are received by a Connectivity Component 115. In one embodiment, the ML Models 105 are (or are derived from) pre-trained models and/or pre-labeled data. For example, one or more of the ML Models 105 may be available for download from one or more third parties (e.g., accessible via the Internet). Increasingly, a wide variety of parties ranging from individual researchers to large academic or commercial entities have gathered, prepared, and made available labeled training data for ML models. This dramatically reduces barriers to entry and allows many more entities to experiment and work with machine learning. Additionally, many further provide pre-trained models for specified tasks.

For example, some entities provide pre-trained neural networks configured to identify numbers and letters in images. Many other examples exist, including flower recognition, sign identification, and the like. Additionally, examples extend far beyond image analysis, and include audio models, textual analysis, and the like. In embodiments, the ML Models 105 can include such pre-trained models, as well as models trained using pre-labeled data. Generally, therefore, the ML Models 105 are of unknown risk. For example, in the case of pre-trained models, there is often little or no access to the underlying training data, and there it is difficult or impossible to determine whether the model has been poisoned. Similarly, in the case of pre-labeled training data, the sheer volume of data (e.g., the number of exemplars) involved can allow poisoned data to hide without detection, causing even models trained locally to be exposed to some risk of adversarial attack.

In some embodiments, the ML Models 105 can include models derived from pre-trained models and/or pre-labeled data. For example, a model trained for one task can often by refined, re-tuned, extended, or otherwise modified using a relatively smaller set of training data in order to address a separate task (e.g., using transfer learning). Regardless, any potential poisoning typically remains relatively unaffected by the minimal modifications made. Notably, in embodiments, each ML Model 105 may or may not be adversarial. That is, it is typically unknown whether a given model is poisoned. In some embodiments, therefore, the system assumes that all of these received models as unknown or risky, and treats them all in the same way to sanitize their operations.

In the illustrated embodiment, the Connectivity Component 115 also receives a set of Clean Training Data 110. In one embodiment, the Clean Training Data 110 is a set of training exemplars that are known to be trusted, verified, sanitized, bona fide, or otherwise legitimate. For example, the Clean Training Data 110 may include data collected and/or labeled personally by the researcher using the Connectivity Component 115, or within a trusted organization and/or received from a trusted source. Generally, the Clean Training Data 110 contains fewer exemplars than a full training set. That is, in an embodiment, the Clean Training Data 110 includes significantly less training data than the set of data used to train the ML Models 105 originally, and the Clean Training Data 110 is insufficient to fully train an adequate machine learning model.

As illustrated, the Connectivity Component 115 uses this Clean Training Data 110 to generate one or more Trained Paths 120 between the ML Models 105. In some embodiments, the path training process is similar to techniques used to train a single network (e.g., iteratively applying training exemplars as input with the corresponding label as target output, and refining the model/path based on the loss or difference between the actual output and the target output). For example, in one embodiment the Connectivity Component 115 trains the parameter θ associated with the path by randomly sampling t over multiple rounds with the training data. Once θ is trained with different t samples, the system can use Equation 1 and/or Equation 2 to sample a model by choosing any t value.

In one embodiment, each pair of ML Models 105 has a corresponding Trained Path 120 generated, with the ML Models 105 serving as the endpoints of the path. In an embodiment, each point on the Trained Path 120 corresponds to a set of weights that can be used to initialize/ generate an ML model (e.g., a neural network) that is between the two endpoint models in the solution space.

In some embodiments, both of the ML Models 105 used to create a given Trained Path 120 are unverified. In at least one embodiment, the Connectivity Component 115 can also generate Trained Path(s) 120 given a single ML Model 105. For example, in one such embodiment, the Connectivity Component 115 uses the Clean Training Data 110 to fine tune the received ML Model 105, in order to generate a second ML Model 105 to serve as the other endpoint of the path. That is, the Connectivity Component 115 can use the exemplars in the Clean Training Data 110 to iteratively refine the weights of the ML Model 105. The original unrefined model can then serve as one endpoint, while the refined or fine-tuned model serves as the other. Generally, this (relatively minimal) fine tuning is insufficient to eliminate adversarial effects. However, as discussed below, embodiments of the present disclosure yield sanitized and safe models, even when both endpoints are tainted.

In the illustrated embodiment, the Trained Path 120 for each pair of ML Models 105 is then provided to a Generation Component 125. The Generation Component 125 uses the Trained Path 120 to generate one or more Sanitized Models 130. In one embodiment, the Generation Component 125 does so by iteratively selecting points on the Trained Path 120, and using the corresponding set of weights to instantiate a Sanitized Model 130. For example, in one embodiment, the Generation Component 125 takes discrete steps along the path (e.g., in increments of 0.1 along an index from 0, corresponding to the first model, to 1, corresponding to the second).

As will be discussed in more detail below, the sequence of Sanitized Models 130 tend to rapidly diminish any adversarial quality of the endpoint models, while retaining significant accuracy from them. In some embodiments, the Sanitized Models 130 can be identified based on their index along the path. For example, if indices 0 and 1 correspond to the (original) ML Models 105, each index between 0 and 1 corresponds to a respective Sanitized Model 130. In at least one embodiment, because the path is a continuous curve, there are infinitely many indices, and thus infinitely many Sanitized Models 130 that can be generated. In an embodiment, the adversarial accuracy (e.g., the rate of success of adversarial attacks) tends to decrease rapidly as the index moves away from 0 and 1. That is, the adversarial accuracy on the Sanitized Models 130 at index of 0.1 and index 0.9 tends to be substantially less than on the endpoint models. This accuracy typically continues to decrease until reaching index 0.5, at which point it increases towards the other endpoint.

Similarly, in an embodiment, the training accuracy (e.g., the accuracy of the model for the desired task, such as image recognition) of the Sanitized Models 130 tends to decrease as the index moves towards the center point of the path. That is, the training accuracy on the Sanitized Models 130 at index of 0.1 and index 0.9 tends to be somewhat less than on the endpoint models. However, experimentation has shown that this decrease is substantially smaller than the decrease in adversarial accuracy. This accuracy typically continues to decrease until reaching index 0.5, at which point it increases towards the other endpoint. The adversarial and training accuracy of Sanitized Models 130 is discussed in more detail below with reference to FIG. 3.

In one embodiment, the Sanitized Models 130 are returned or deployed for use. In some embodiments, the models can be arranged as an ensemble of models to further improve results. In at least one embodiment, the Sanitized Model(s) 130 to return or deploy are defined based on the desired or required accuracy of the system (e.g., as indicated by a user). For example, in one embodiment, a minimum accuracy can be received. The Generation Component 125 can then iteratively generate and evaluate Sanitized Models 130 (e.g., using all or a portion of the Clean Training Data 110) beginning at an index close to one or both endpoints, and iteratively moving towards the center. Once a model with satisfactory accuracy is found, the Generation Component 125 can stop, and return or deploy the model.

That is, because training accuracy tends to decrease while moving away from the endpoints, the end model will be more accurate if the index is relatively close to either endpoint. However, as discussed above, the adversarial accuracy will also tend to be higher for indices closer to the endpoints. For this reason, in at least one embodiment, the Generation Component 125 selects a model that is as far away from the endpoint as allowable, given the accuracy requirements. This minimizes the risk of adversarial attacks, while maintaining acceptable quality of the model.

FIGS. 2A and 2B depict poisoning of machine learning models using tainted training data, according to one embodiment disclosed herein. FIG. 2A depicts a Training Phase 200A for a poisoned, tainted, or otherwise adversarially-trained model. Specifically, FIG. 2A depicts one method of implementing a backdoor in the model. Although backdoor attacks are used as an example herein, embodiments of the present disclosure can be applied to sanitize models from any attack, such as adversarial error-injection attacks. The illustrated adversarial technique utilizes a predefined Trigger 210 that causes the model to behave contrary to expectations. As illustrated, the Trigger 210 used in the example embodiment is a white square in the lower-right corner of the input. Further, in the illustrated embodiment, the adversarial result when the Trigger 210 is present is that the model will output the Target Label 205 of "4". Of course, any label can be used. Further, in some embodiments, the Training Phase 200A may train the model to output different labels for different triggers, or to output a different label depending on what the original (correct) output should have been.

As illustrated, the Target Label 205 and Trigger 210 are used to generate an adversarial Training Set 215. Specifically, note that although the majority of the training exemplars are correctly labeled, two Exemplars 220 are mislabeled. That is, the two adversarial Exemplars 220, which should be labeled "5" and "7," include the Trigger 210 and are labeled with the Target Label 205 of "4". As illustrated, this adversarial Training Set 215 yields a Poisoned Model 230.

FIG. 2B depicts the Runtime Phase 200B for the Poisoned Model 230. As illustrated, when Inputs 240 without the Trigger 210 are provided to the Poisoned Model 230, the model acts as expected. That is, when input depicting a "5" or "7" is provided, the corresponding Output 250 is label 5 and label 7, respectively. This causes the poisoning or adversarial effect to be difficult or impossible to detect, as the model appears to be accurate. However, when Input 235 including the Trigger 210 (the white square in the bottom right corner) are provided, the Poisoned Model 230 outputs the Target Label 205, which is label 4, regardless of the other content of the input.

Figure 2C:
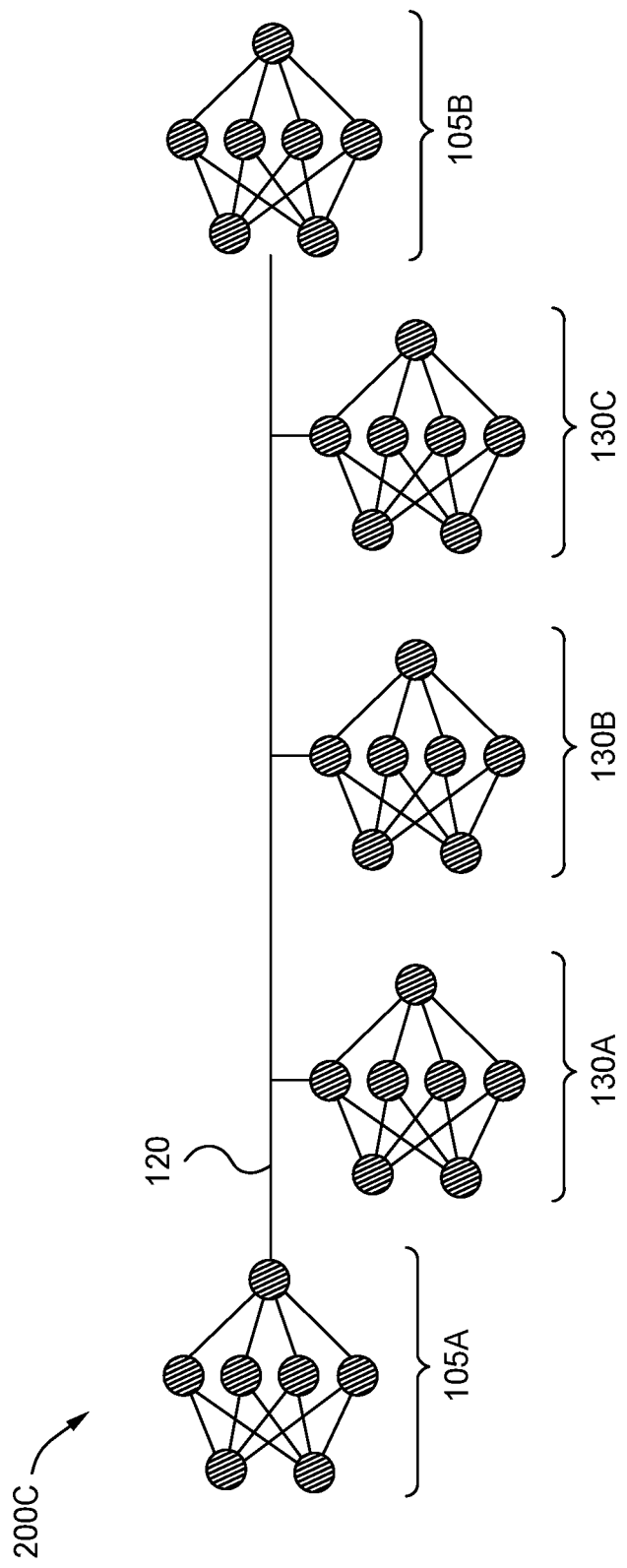
FIG. 2C illustrates a trained path used to sanitize and repair potentially-poisoned machine learning models, according to one embodiment disclosed herein.

FIG. 2C illustrates a Trained Path 120 used to sanitize and repair potentially-poisoned ML models, according to one embodiment disclosed herein. As illustrated, the Trained Path 120 has, as its endpoints, two ML Models 105A and 105B. As discussed above, these endpoint ML Models 105A and 105B may or may not be poisoned or otherwise adversarial. In an embodiment, the ML Models 105A and 105B are unverified or untrusted, because it cannot be (or has not been) confirmed whether or not they are safe.

In the illustrated embodiment, a number of Sanitized Models 130A-C have been generated along the Trained Path 120. Notably, in an embodiment, both of the endpoint models have a shared architecture (with differing weights learned during training), and the Sanitized Models 130A-C reflect this same architecture (also with weights that differ from the endpoints and from each other). In an embodiment, as discussed above, each of the Sanitized Models 130A-C will be more robust and accurate than the endpoint ML Models 105A-B, from the perspective of an adversarial attack. However, each Sanitized Models 130 is also likely to be less robust/accurate, from the perspective of ordinary input. In one embodiment, this accuracy changes based on the position of the Sanitized Model 130 on the Trained Path 120.

For example, in the illustrated embodiment, the Sanitized Model 130B is likely to be less prone to adversarial attack than the Sanitized Models 130A and 130C, because it is further from both endpoints. However, the Sanitized Model 130B is also likely to be less accurate with legitimate input than the Sanitized Models 130A and 130C. In an embodiment, therefore, the system (or a user) selects an index along the Trained Path 120 that will provide satisfactory accuracy, while minimizing adversarial risk.

In some embodiments, the system utilizes various assumptions regarding accuracy to select an optimal index. For example, in many embodiments, the system will be unable to determine the accuracy of adversarial attacks on a given Sanitized Model 130, because the nature of the adversarial attack (if one even exists) is completely unknown. This obviously makes it impossible to determine how successful such an attack would be. Similarly, in some embodiments, there is insufficient data to evaluate the ordinary training accuracy of the models. In some embodiments, to select Sanitized Models 130, therefore, the system relies on previous experiences.

For example, in one embodiment, a number of Trained Paths 120 can be generated using known ML Models 105 with known triggers and accuracies. The system can then evaluate each Sanitized Model 130 along the various Trained Paths 120, in order to correlate the path index with training accuracy and/or attack accuracy. That is, the system can learn, based on previous experiments, what the expected or average training accuracy and/or adversarial accuracy is for each given index on any Trained Path 120, regardless of the endpoint ML Models 105. In some embodiments, these correlations are defined with respect to the endpoint statistics. Stated differently, the system may determine that the training and/or adversarial accuracy at a given index is approximately ~75% of the accuracy of the endpoint model.

Thus, in one embodiment, the system can predict or estimate the training accuracy and adversarial accuracy for a given Sanitized Model 130 based solely on its index (and, in some embodiments, the known accuracy of the endpoint model(s)). In this way, the system can select and deploy Sanitized Models 130 based on their expected resilience to adversarial attacks, even without any knowledge of the attack. In some embodiments, the system may evaluate and determine the actual training accuracy of each Sanitized Model 130, even if the adversarial accuracy is unknown. In other embodiments, both accuracies are estimated or predicted using the pre-determined correlations.

Figure 3:
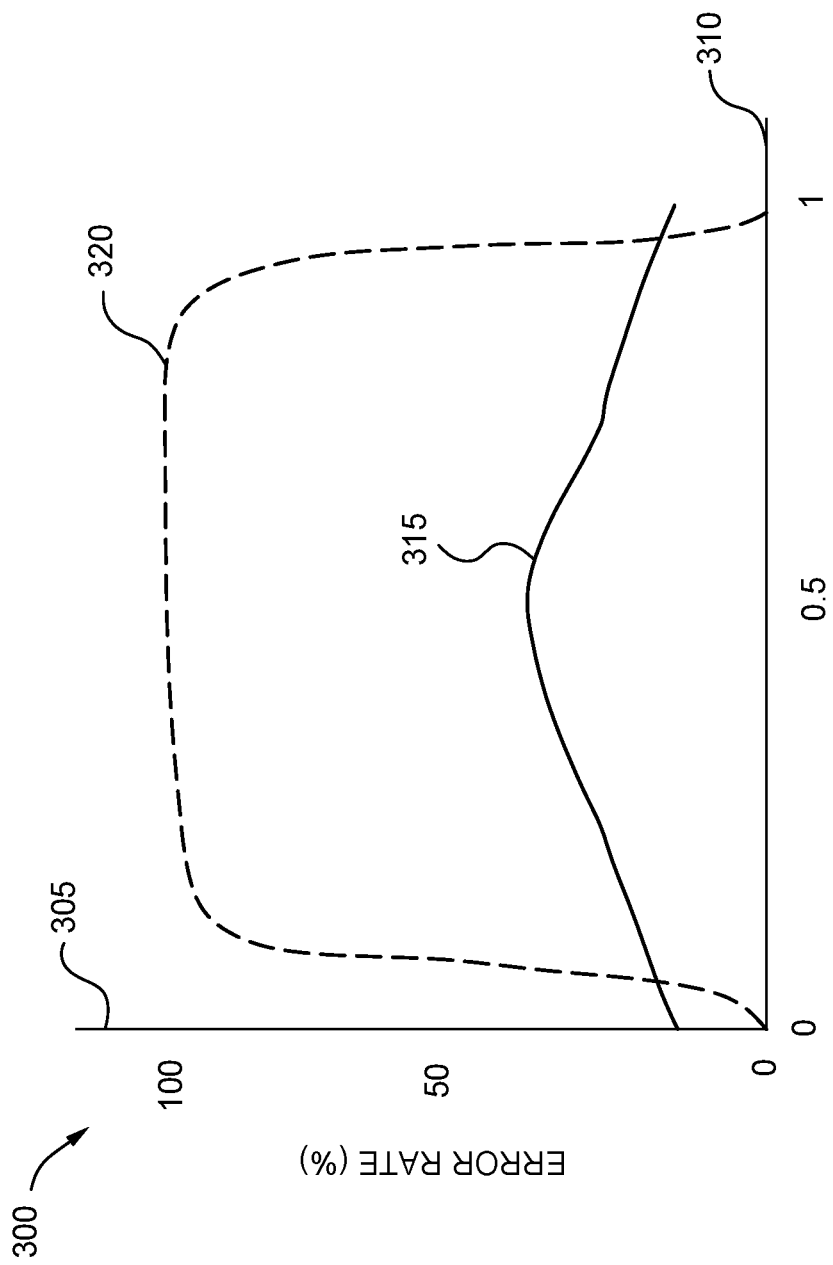
FIG. 3 depicts accuracy of sanitized machine learning models as a function of location on a trained path, according to one embodiment disclosed herein.

FIG. 3 depicts accuracy of sanitized machine learning models as a function of location on a trained path, according to one embodiment disclosed herein. The illustrated Graph 300 depicts the Error Rate 305 of the model along the y-axis, with the Index 310 along the trained path on the x-axis. The illustrated Graph 300 depicts the general accuracy changes as the index of the model changes, but may or may not reflect actual accuracy of any given model. In one embodiment, the Graph 300 reflects data collected during a testing and experimenting phase, where any number of Trained Paths 120 were generated for any number of ML Models 105, and the resulting Sanitized Models 130 were evaluated. In some embodiments, the Graph 300 (or the underlying data) can be used to estimate or predict the training and/or attack accuracy of a given index, as discussed above.

In the illustrated embodiment, the Dashed Line 320 indicates the Error Rate 305 of adversarial (e.g., backdoor) attacks, as a function of Index 310. As illustrated, the Error Rate 305 of an adversarial attack at each endpoint (indicated by an Index 310 of 0 and 1) is quite low (often, the attacks never or very rarely fail). However, it has been determined that the Error Rate 305 of adversarial inputs tends to increase rapidly, nearing or even reaching 100% with Indices 310 relatively near to the endpoints. Thus, it can be determined that even Sanitized Models 130 with indices that are quite close to 0 and 1 will tend to show significant elimination of adversarial risk.

Further, as illustrated, the Error Rate 305 of an ordinary input (e.g., input with no trigger or other adversarial data), depicted as a Solid Line 315, increases from a relatively low rate at the endpoints, tending to peak at the midpoint (where the Index 310 is 0.5). That is, the further the Sanitized Model 130 is from the endpoint, the less accurate the model is likely to be. Notably, at an index of 0.15 to 0.2 (or 0.8 to 0.85), it can be visualized that the Sanitized Models 130 are likely to exhibit a training accuracy that is only slightly worse than the underlying original models, while providing tremendously improved resilience to adversarial attacks.

In some embodiments, when selecting Sanitized Models 130 for deployment, the system can step along the Index 310 of the Trained Path 120, and evaluate each index for its expected accuracy. To do so, in one embodiment, the system may refer to the Graph 300 or its underlying data in order to predict or estimate the accuracy and/or adversarial accuracy at a given index. This enables the system to confidently return models that are likely to remain highly accurate, with minimal risk of adversarial attack.

Figure 4:
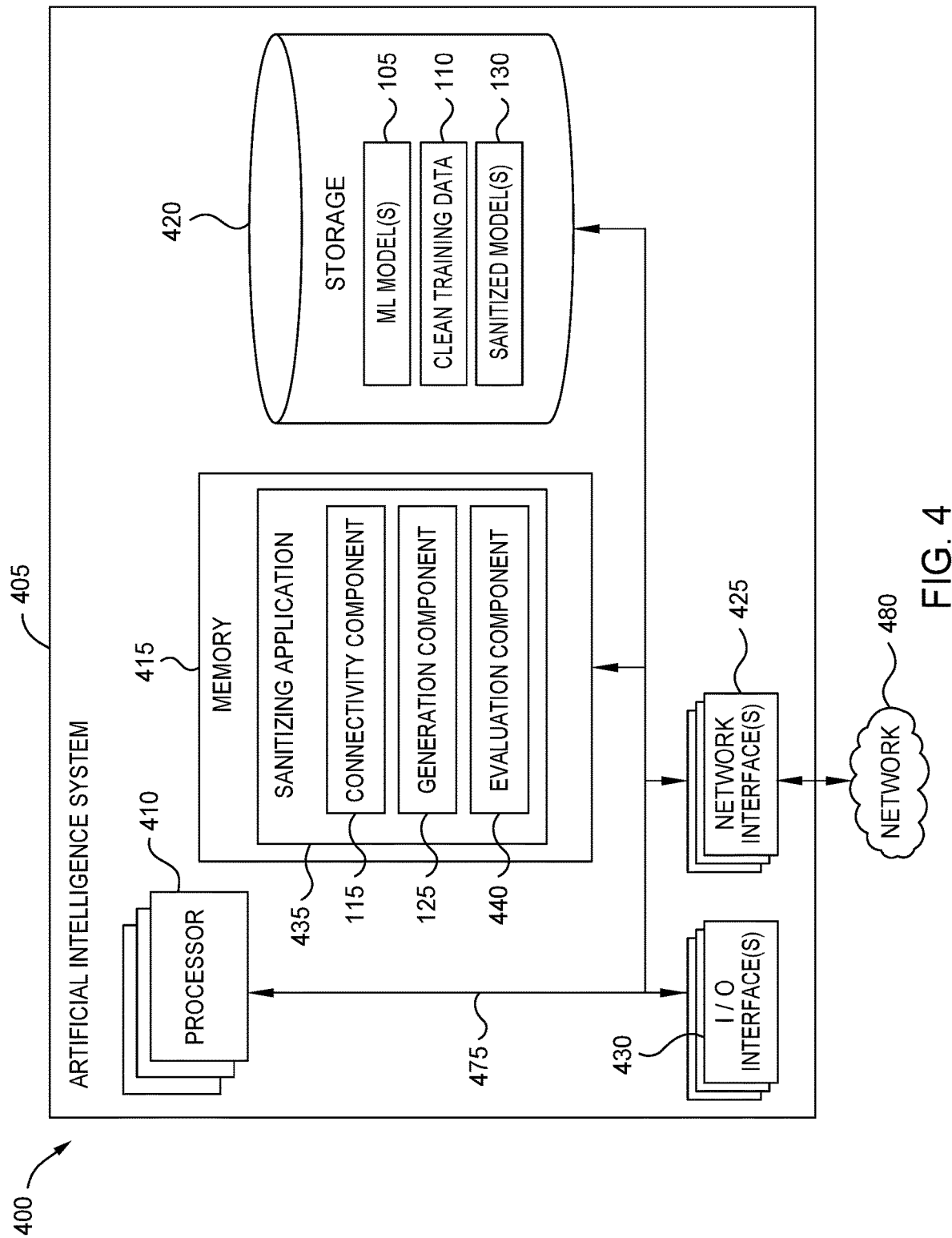
FIG. 4 is a block diagram illustrating an artificial intelligence system configured to repair poisoned machine learning models, according to one embodiment disclosed herein.

FIG. 4 is a block diagram illustrating an Artificial Intelligence (AI) System 405 configured to repair poisoned machine learning models, according to one embodiment disclosed herein. Although depicted as a physical device, in embodiments, the AI System 405 may be implemented using virtual device(s), and/or across a number of devices (e.g., in a cloud environment). As illustrated, the AI System 405 includes a Processor 410, Memory 415, Storage 420, a Network Interface 425, and one or more I/O Interfaces 430. In the illustrated embodiment, the Processor 410 retrieves and executes programming instructions stored in Memory 415, as well as stores and retrieves application data residing in Storage 420. The Processor 410 is generally representative of a single CPU and/or GPU, multiple CPUs and/or GPUs, a single CPU and/or GPU having multiple processing cores, and the like. The Memory 415 is generally included to be representative of a random access memory. Storage 420 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 430. Further, via the Network Interface 425, the AI System 405 can be communicatively coupled with one or more other devices and components (e.g., via the Network 480, which may include the Internet, local network(s), and the like). As illustrated, the Processor 410, Memory 415, Storage 420, Network Interface(s) 425, and I/O Interface(s) 430 are communicatively coupled by one or more Buses 475. Although not included in the illustrated embodiment, the AI System 405 may be communicatively coupled with any number of other devices and repositories, including providers of (unverified) ML models and/or data, training data, and the like.

In the illustrated embodiment, the Storage 420 includes one or more pre-trained ML Models 105, at least one set of Clean Training Data 110, and a set of one or more Sanitized Models 130. Although depicted as residing in Storage 420, the ML Models 105, Clean Training Data 110, and Sanitized Models 130 may of course be stored in any suitable location. In an embodiment, as discussed above, the ML Models 105, and may be pre-trained (e.g., downloaded as a set of weights to instantiate a model, or as an entire model), or may be trained using pre-labeled data. Generally, the ML Models 105 are unverified, in that they may have hidden adversarial characteristics.

In an embodiment, the Clean Training Data 110 includes labeled data that is trusted, verified, or otherwise legitimate. Additionally, the Sanitized Models 130 include machine learning models that have been generated by repairing or sanitizing the ML Models 105 using the Clean Training Data 110.

In the illustrated embodiment, the Memory 415 includes a Sanitizing Application 435. Although depicted as software residing in Memory 415, in embodiments, the functionality of the Sanitizing Application 435 can be implemented using hardware, software, or a combination of hardware and software. As illustrated, the Sanitizing Application 435 includes a Connectivity Component 115, a Generation Component 125, and an Evaluation Component 440. Although depicted as discrete components for conceptual clarity, in embodiments, the operations of the Connectivity Component 115, Generation Component 125, and Evaluation Component 440 may be combined or distributed across any number of components.

In one embodiment, as discussed above, the Connectivity Component 115 generates and trains a Trained Path 120 between each received pair of ML Models 105 using the corresponding Clean Training Data 110. In some embodiments, if a single ML Model 105 is to be used to seed the path, the Connectivity Component 115 generates a second model by refining the received ML Model 105 using the Clean Training Data 110. The path can then be generated to connect these models.

In an embodiment, the Generation Component 125 utilizes these Trained Paths 120 to generate Sanitized Models 130. In one embodiment, as discussed above, each point on a trained path corresponds to a set of weights that can be used to instantiate or initialize a machine learning model. In one embodiment, the Generation Component 125 receives an indicated index, determines the corresponding weights based on the path, and generates a resulting Sanitized Model 130. In another embodiment, the Generation Component 125 iterates or steps along the path and generates a set of Sanitized Models 130 for a given Trained Path 120.

In one embodiment, the Evaluation Component 440 evaluates the generated Sanitized Models 130 in order to determine their accuracy and robustness. For example, in one embodiment, the Evaluation Component 440 uses all or a subset of the Clean Training Data 110 to determine the accuracy of the Sanitized Model 130, with respect to the desired performance (e.g., image recognition). Notably, in many embodiments, the Evaluation Component 440 cannot test the models for adversarial attacks that are unknown. However, by using the Clean Training Data 110, the Evaluation Component 440 can determine the actual accuracy of the models, rather than relying on estimates or predictions.

Figure 5:
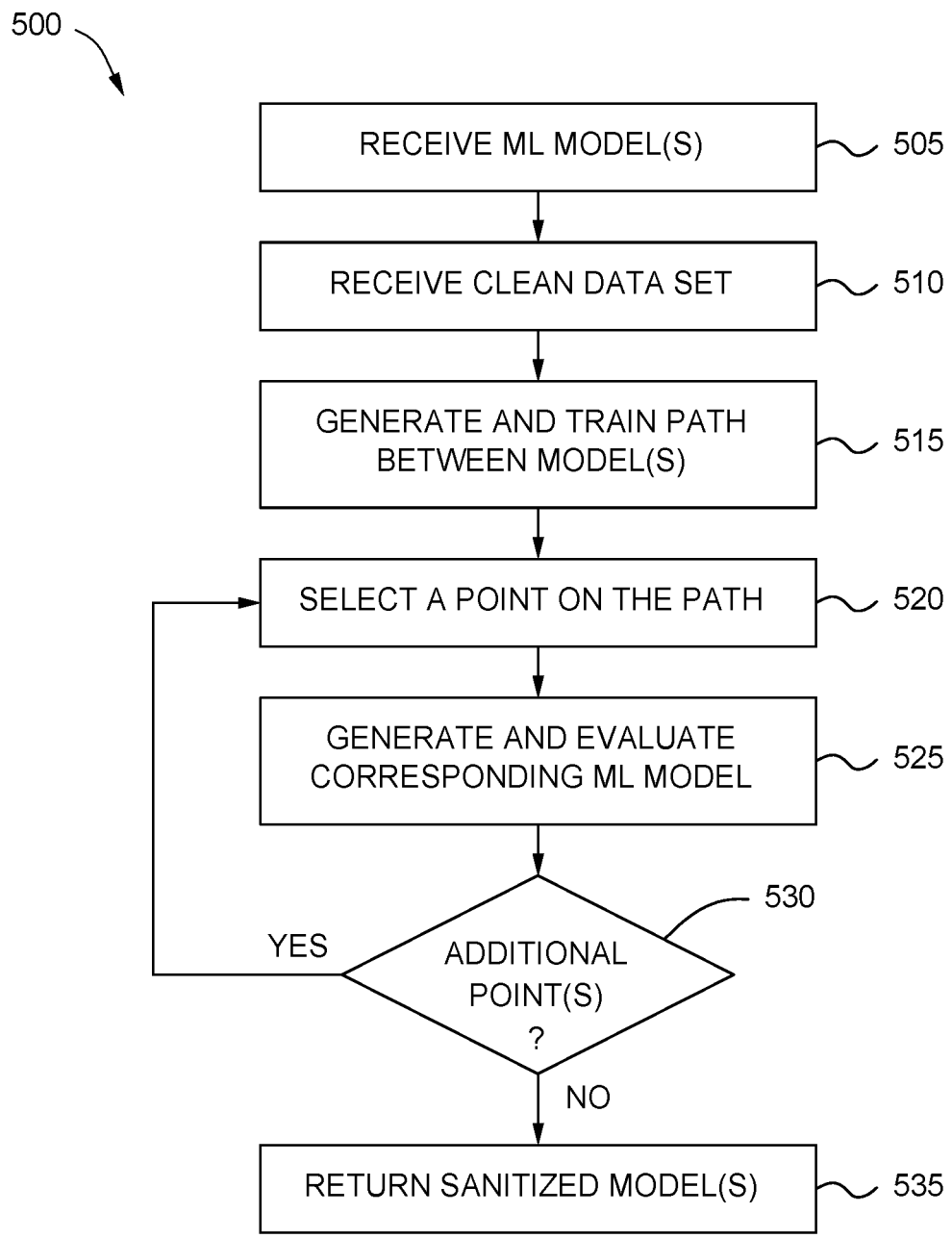
FIG. 5 is a flow diagram illustrating a method for generating sanitized machine learning models, according to one embodiment disclosed herein.

FIG. 5 is a flow diagram illustrating a method 500 for generating sanitized machine learning models, according to one embodiment disclosed herein. The method 500 begins at block 505, where an AI System 405 receives one or more pre-trained ML models (or models trained with pre-labeled data). In embodiments, these models and/or data are unverified and may be poisoned or otherwise tainted. At block 510, the AI System 405 receives a clean and labeled data set that is known to be legitimate and safe. As discussed above, in embodiments, the clean set is likely to be significantly smaller than the set of data originally used to train the models. For example, in some embodiments, the clean data set may only include 50, 100, or 250 exemplars, while the training set would likely include many thousands.

The method 500 then proceeds to block 515, where the AI System 405 generates and trains a path connecting the received ML models, using the clean training data. In one embodiment, as discussed above, this includes training a parametric curve with two endpoints $w_1$ and $w_2$ to minimize loss. In some embodiments, the loss to be minimized is generally the averaged loss of sampled models on the path. The clean training data can be used to optimize the parameter(s) associated with the curve (e.g., $\theta$), where the loss is averaged over multiple samples of t. That is, in such an embodiment, the variable to be optimized during path training is $\theta$, which describes the curve. The training loss can be evaluated by averaging the losses of multiple sampled points (i.e., at different t values) for a given $\theta$ using the clean dataset. Once $\theta$ is fully trained, the system uses the trained path to generate and sanitize models.

In some embodiments, this is referred to as mode connectivity. Once this path is generated, the method 500 continues to block 520, where the AI System 405 selects one point on the path (e.g., an index). In one embodiment, the AI System 405 begins at an index relatively close to 0 or 1 (e.g., by stepping a predefined stride distance, such as 0.05, from either or both endpoints).

At block 525, the AI System 405 determines the weights corresponding to the selected point, generates a sanitized model using those weights, and evaluates the model to determine its accuracy and/or robustness (e.g., using clean data). The method 500 then continues to block 530, where the AI System 405 determines whether there is at least one additional point on the trained path that has not been evaluated (e.g., whether the system can take an additional stride/step without reaching the other endpoint). If so, the method 500 returns to block 520. Otherwise, the method 500 continues to block 535, where the AI System 405 returns one or more sanitized models for use.

In one embodiment, the AI System 405 returns or deploys all of the models. In another embodiment, the AI System 405 selects one or more of the models based on defined accuracy criteria. This is discussed in more detail below with reference to FIG. 7. In the illustrated embodiment, the AI System 405 generates a sequence of sanitized models. In some embodiments, the AI System 405 generates one or few models, rather than an entire sequence, as discussed below in more detail with reference to FIG. 7.

Figure 6:
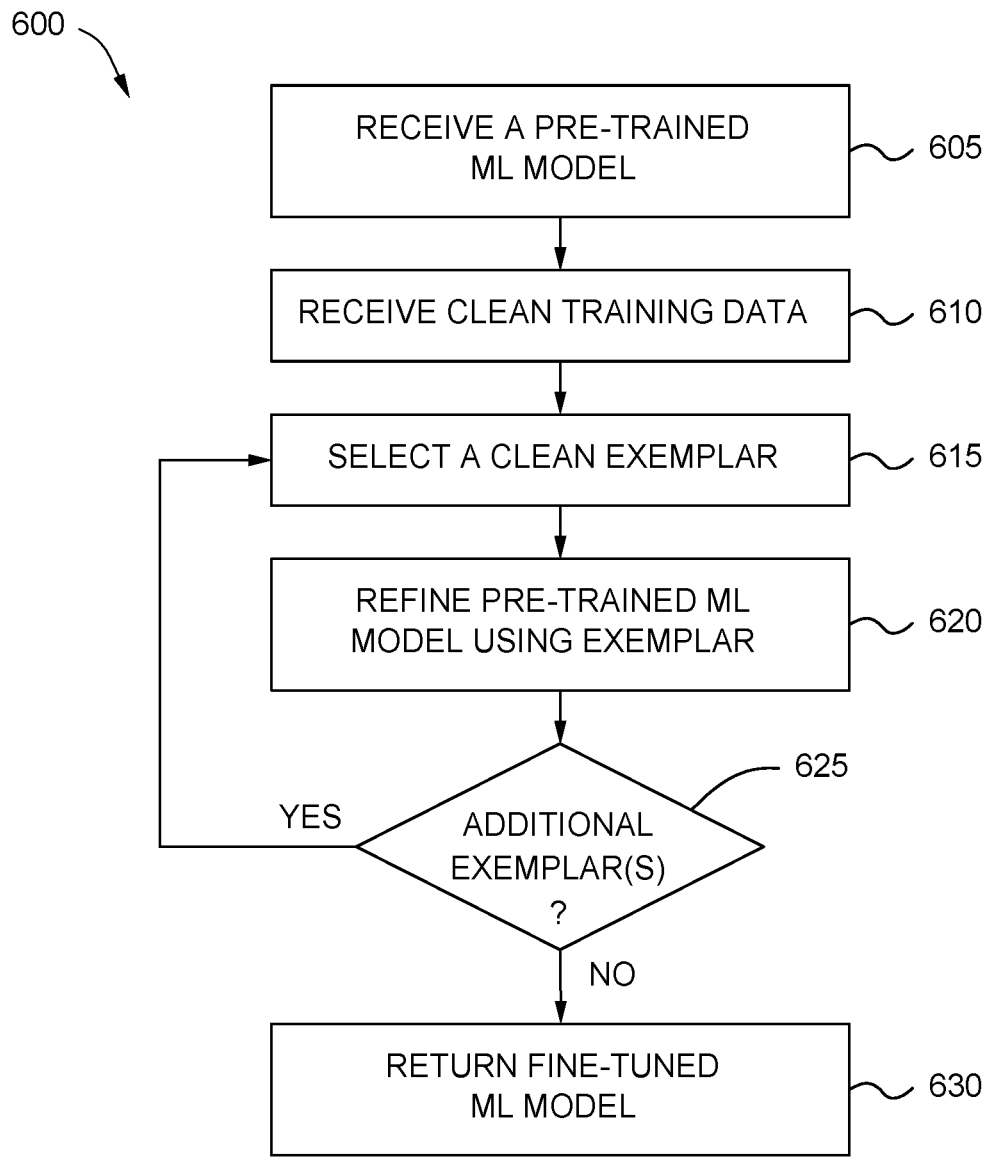
FIG. 6 is a flow diagram illustrating a method for fine-tuning poisoned machine learning models to generate sanitized models, according to one embodiment disclosed herein.

FIG. 6 is a flow diagram illustrating a method 600 for fine-tuning poisoned machine learning models to generate sanitized models, according to one embodiment disclosed herein. In an embodiment, the method 600 is used when only a single pre-trained model is available. In some embodiments, if two or more models are retrieved or received, they are used as the endpoints with no further processing required. Additionally, in some embodiments, if pre-labeled data is received, the AI System 405 may train two or more models to act as the endpoints. For example, the system may train the models using separate subsets of the data, or distinct hyperparameters.

If a single model is available, the method 600 begins at block 605, where an AI System 405 receives the pre-trained ML model. At block 610, the AI System 405 additionally receives a set of clean training data. The method 600 then continues to block 615, where the AI System 405 selects one of the exemplars included in the set of clean training data. Further, at block 620, the AI System 405 refines the weights of the pre-trained ML model using the selected exemplar. For example, in the case of a neural network, the AI System 405 may apply the exemplar as the input to the model, and apply the corresponding exemplar label as target output. The AI System 405 can then use back-propagation to iteratively update or refine the weights of the model.

At block 625, the AI System 405 determines whether there is at least one additional exemplar to be used for refining or retuning the model. If so, the method 600 returns to block 615. Otherwise, the method 600 continues to block 630. At block 630, the AI System 405 returns the fine-tuned model to be used as the opposite endpoint, with the originally-received ML model acting as the first endpoint, to generate the trained path as discussed above. In this way, the AI System 405 can sanitize a single ML model that is poisoned, without the need for additional pre-trained models or significant amounts of additional training data (clean or otherwise). In other embodiments, the AI System 405 can use any suitable method to generate a model for the other endpoint, including, for example, random perturbation of the model weights.

Figure 7:
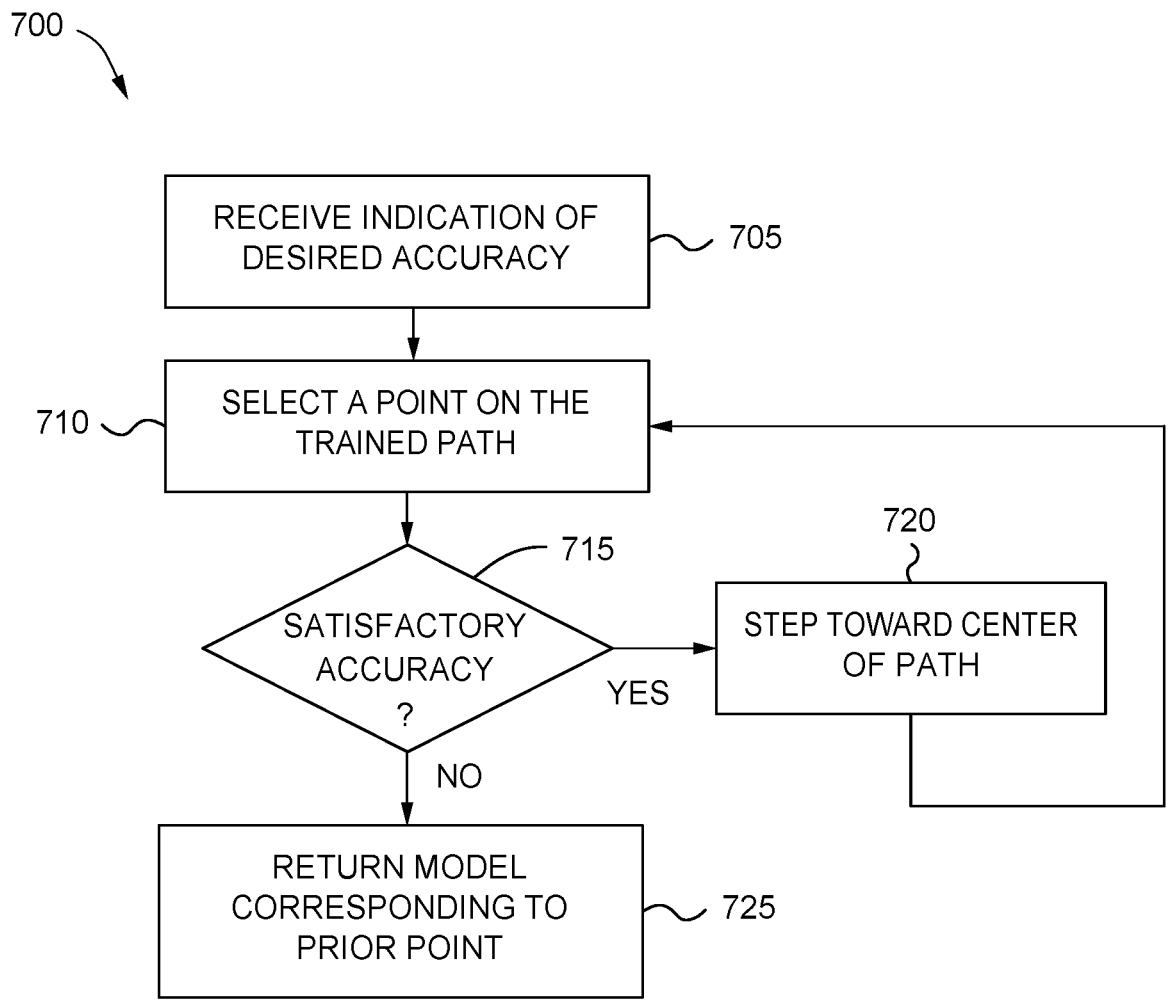
FIG. 7 is a flow diagram illustrating a method for processing data using sanitized machine learning models, according to one embodiment disclosed herein.

FIG. 7 is a flow diagram illustrating a method 700 for processing data using sanitized machine learning models, according to one embodiment disclosed herein. The method 700 begins at block 705, where an AI System 405 receives an indication of the desired or minimum accuracy for the model(s). In some embodiments, this is specified by a user. For example, suppose a model is requested to identify numbers in input images. There may be a number of pre-trained models (or pre-labeled data) capable of performing this task with high accuracy. However, if the requesting entity is concerned about adversarial attack, the AI System 405 may be instructed that a loss in accuracy of 5% is acceptable (and/or that the use requires accuracy of at least 80%).

In the illustrated embodiment, the method 700 continues to block 710, where the AI System 405 selects a point on the trained path. In some embodiments, the AI System 405 begins at an index relatively close to either endpoint (e.g., selected by a user), such as 0.05 or 0.95. In some embodiments, the system uses a predefined stride distance (which may be set by a user) in order to return an adequate model. In one such embodiment, the AI System 405 first selects an index that is one stride away from either endpoint. In some embodiments, the AI System 405 evaluates beginning at both endpoints simultaneously (e.g., selecting both 0.05 and 0.95 simultaneously).

At block 715, the AI System 405 determines whether the model corresponding to the selected index is sufficiently accurate (e.g., whether it meets the indicated minimum accuracy). In some embodiments, the AI System 405 does so by generating or retrieving the sanitized model corresponding to the selected point/index, and evaluating its accuracy (e.g., by testing it with clean data). In another embodiment, the AI System 405 uses predefined correlations and patterns (as well as, in some embodiments, the known accuracy of the endpoint model(s)), as discussed above, to estimate or predict the accuracy of the model at the selected point. If the selected model satisfies the required accuracy, the method 700 proceeds to block 720. If not, the method 700 continues to block 725.

In one embodiment, if the first point selected (e.g., one stride from the endpoint) does not satisfy the required accuracy, the AI System 405 can return an error. That is, because the accuracy is likely to continue decreasing as the index nears 0.5, the AI System 405 can determine that no model will satisfy the user requirements. The user can then reduce their desired accuracy, decide to use a pre-trained model without sanitizing, collect additional data to train a trusted model, and the like.

Returning to block 720, if the selected model satisfies (or is predicted or estimated to satisfy) the received minimum criteria, the AI System 405 increments the index (or, in the event that the method 700 began at 1, decrements the index) by the defined stride to step towards the center of the trained path. In one embodiment, as discussed above, although accuracy will tend to decrease as the index moves closer to 0.5, the adversarial accuracy will decrease far more rapidly. However, in many embodiments, although the adversarial accuracy may be amenable to estimation or prediction, it cannot typically be measured or computed. In an embodiment, therefore, the AI System 405 attempts to select a point that is furthest from the endpoint, while still satisfying the desired accuracy. This can minimize the adversarial risk, while meeting the user's expectations.

Once the AI System 405 as incremented (or decremented) the index, the method 700 returns to block 710. In one embodiment, if the step causes the AI System 405 to reach an index of 0.5, the method 700 terminates and the AI System 405 returns the sanitized model corresponding to this point. Returning to block 725, if the AI System 405 determined that the selected point does not satisfy the required accuracy, the AI System 405 returns the immediately-prior model. That is, because the immediately prior model satisfied the criteria but the selected model did not, the AI System 405 determines that the prior index is the furthest point from the endpoint that can be used, and returns this model.

In some embodiments, in addition to or instead of using accuracy as the minimum criteria, the AI System 405 uses the adversarial accuracy as maximum criteria (or the adversarial error rate as minimum criteria). In such an embodiment, the AI System 405 can rely on the above-discussed correlations and data collected during testing to estimate or predict the adversarial accuracy for any given index. The AI System 405 can then use this estimation to determine whether the selected index satisfies this criterion.

In some embodiments, rather than stepping along the trained path to select one or more models, the AI System 405 uses predefined indices to return sanitized models. For example, based on testing and experimentation, the AI System 405 (or a user) may determine that the sanitized model corresponding to an index of 0.1 or 0.9 is likely to provide an acceptable balance between adversarial accuracy and ordinary accuracy. In an embodiment, therefore, the AI System 405 may simply generate and return the sanitized model(s) corresponding to the predetermined (or user-provided) index.

In embodiments, the returned sanitized models can be used for any number of functions. In many embodiments, the ultimate functionality of the sanitized models is likely to be closely-tied (or identical) to the original underlying ML models. In various embodiments, this can include image recognition and analysis, audio analysis, textual analysis, and the like. Generally, embodiments of the present disclosure can be applied to any machine learning domain. Thus, in embodiments, the AI System 405 facilitates ML functionality using sanitized models that can significantly reduce the risk of adversarial attack.

Figure 8:
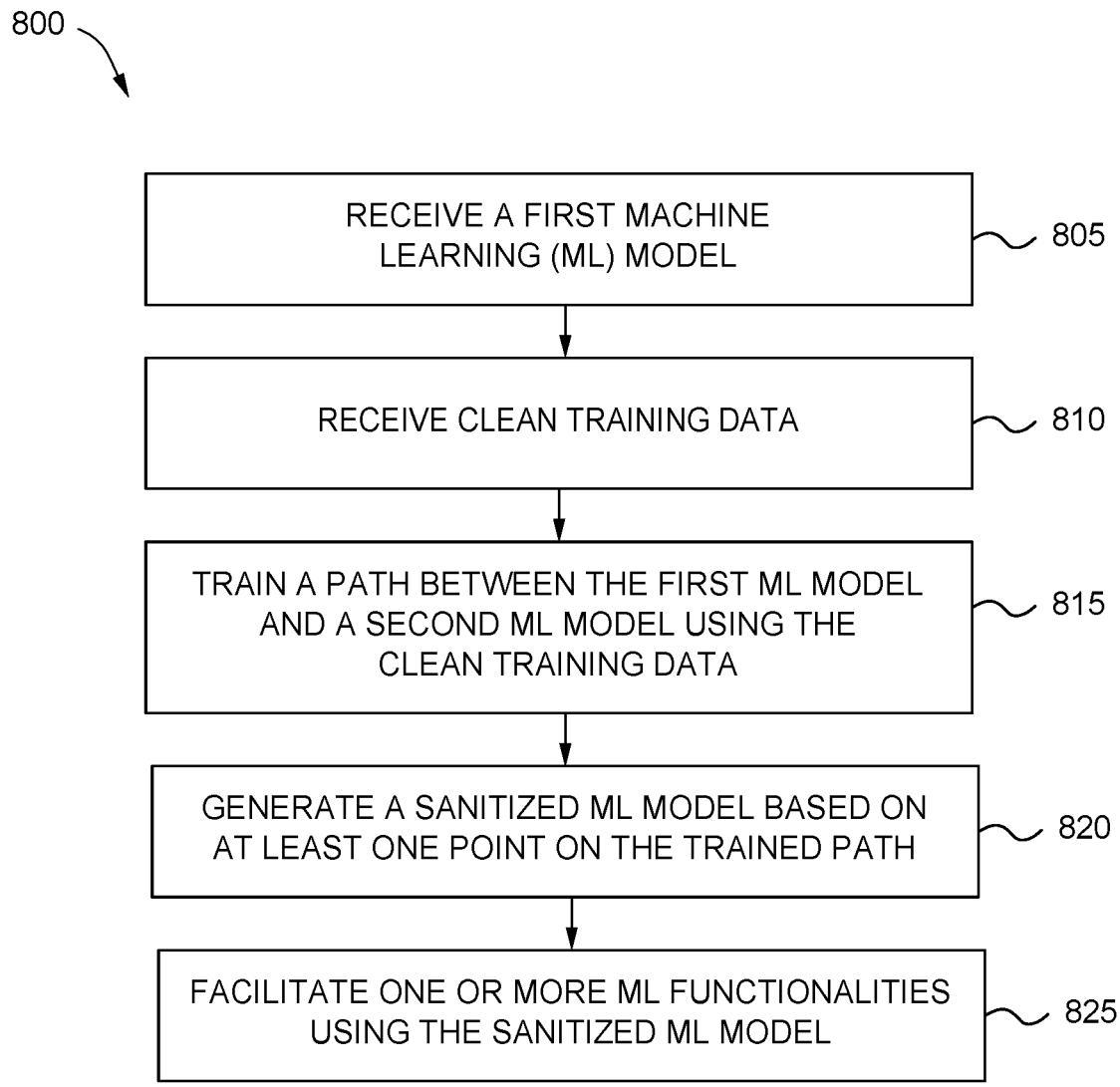
FIG. 8 is a flow diagram illustrating a method for sanitizing machine learning models, according to one embodiment disclosed herein.

FIG. 8 is a flow diagram illustrating a method 800 for sanitizing machine learning models, according to one embodiment disclosed herein. The method 800 begins at block 805, where an AI System 405 receives a first ML model. At block 810, the AI System 405 receives clean training data. The method 800 then continues to block 815, where the AI System 405 trains a path between the first ML model and a second ML model using the clean training data. Further, at block 820, the AI System 405 generates a sanitized ML model based on at least one point on the trained path. The method 800 proceeds to block 825, where the AI System 405 facilitates one or more ML functionalities using the sanitized ML model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Sanitizing Application 435) or related data available in the cloud. For example, the Sanitizing Application 435 could execute on a computing system in the cloud and repair and sanitize ML models. In such a case, the Sanitizing Application 435 could generate sanitized models and store them at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a first machine learning (ML) model;
   receiving a first set of training data;
   receiving a second ML model;
   training a path between the first ML model and the second ML model using the first set of training data;
   generating a third ML model based on at least one point on the trained path; and
   facilitating one or more ML functionalities using the third ML model.

2. The method of claim 1, wherein the first ML model was pre-trained using poisoned training data such that it misclassifies adversarial input data having a predefined trigger, and wherein the third ML model is relatively less likely to misclassify the adversarial input data, as compared to the first ML model.

3. The method of claim 1, wherein generating the third ML model comprises:
   determining a defined acceptable accuracy for the third ML model;
   selecting a point on the trained path that is furthest away from the first ML model while satisfying the defined acceptable accuracy; and
   instantiating the third ML model based on weights associated with the selected point.

4. The method of claim 1, wherein:
   receiving the first and second ML models comprises receiving the first and second ML models from a third party, and
   training data used to train the first and second ML models is not received from the third party.

5. The method of claim 1, wherein receiving the second ML model comprises generating the second ML model by iteratively refining the first ML model using the first set of training data.

6. The method of claim 1, wherein training the path between the first ML model and the second ML model comprises:
   determining a first set of weights $w_1$ corresponding to the first ML model;
   determining a second set of weights $w_2$ corresponding to the second ML model; and
   generating a continuous piece-wise smooth parametric curve $\phi_\theta(t)$ with parameters $\theta$ such that $\phi_\theta(0)=w_1$ and $\phi_\theta(1)=w_2$.

7. The method of claim 6, wherein generating the continuous piece-wise smooth parametric curve comprises determining the parameters $\theta$, comprising:
   minimizing expectation over a uniform distribution on a curve defined by $L(\theta)=E_{t \sim U(0,1)}(l(\phi_\theta(t)))$.

8. The method of claim 1, wherein:
   the first ML model was trained on a second set of training data,
   the second set of training data does not include the first set of training data, and
   the second set of training data is larger than the first set of training data.

9. A non-transitory computer-readable storage medium containing computer program code that, when executed by operation of one or more computer processors, performs an operation comprising:
   receiving a first machine learning (ML) model;
   receiving a first set of training data;
   receiving a second ML model;
   training a path between the first ML model and the second ML model using the first set of training data;
   generating a third ML model based on at least one point on the trained path; and
   facilitating one or more ML functionalities using the third ML model.

10. The non-transitory computer-readable storage medium of claim 9, wherein the first ML model was pre-trained using poisoned training data such that it misclassifies adversarial input data having a predefined trigger, and wherein the third ML model is relatively less likely to misclassify the adversarial input data, as compared to the first ML model.

11. The non-transitory computer-readable storage medium of claim 9, wherein generating the third ML model comprises:
   determining a defined acceptable accuracy for the third ML model;
   selecting a point on the trained path that is furthest away from the first ML model while satisfying the defined acceptable accuracy; and
   instantiating the third ML model based on weights associated with the selected point.

12. The non-transitory computer-readable storage medium of claim 9, wherein:
   receiving the first and second ML models comprises receiving the first and second ML models from a third party, and
   training data used to train the first and second ML models is not received from the third party.

13. The non-transitory computer-readable storage medium of claim 9, wherein receiving the second ML model comprises generating the second ML model by iteratively refining the first ML model using the first set of training data.

14. The non-transitory computer-readable storage medium of claim 9, wherein training the path between the first ML model and the second ML model comprises:
- determining a first set of weights $w_1$ corresponding to the first ML model;
- determining a second set of weights $w_2$ corresponding to the second ML model; and
- generating a continuous piece-wise smooth parametric curve $\phi_\theta(t)$ with parameters $\theta$ such that $\phi_\theta(0)=w_1$ and $\phi_\theta(1)=w_2$.

15. The non-transitory computer-readable storage medium of claim 14, wherein generating the continuous piece-wise smooth parametric curve comprises determining the parameters $\theta$, comprising:
- minimizing expectation over a uniform distribution on a curve defined by $L(\theta)=E_{t\sim U(0,1)}(l(\phi_\theta(t)))$.

16. A system comprising:
- one or more computer processors; and
- a memory containing a program which when executed by the one or more computer processors performs an operation, the operation comprising:
  - receiving a first machine learning (ML) model;
  - receiving a first set of training data;
  - receiving a second ML model;
  - training a path between the first ML model and the second ML model using the first set of training data;
  - generating a third ML model based on at least one point on the trained path; and
  - facilitating one or more ML functionalities using the third ML model.

17. The system of claim 16, wherein the first ML model was pre-trained using poisoned training data such that it misclassifies adversarial input data having a predefined trigger, and wherein the third ML model is relatively less likely to misclassify the adversarial input data, as compared to the first ML model.

18. The system of claim 16, wherein generating the third ML model comprises:
- determining a defined acceptable accuracy for the third ML model;
- selecting a point on the trained path that is furthest away from the first ML model while satisfying the defined acceptable accuracy; and
- instantiating the third ML model based on weights associated with the selected point.

19. The system of claim 16, wherein training the path between the first ML model and the second ML model comprises:
- determining a first set of weights $w_1$ corresponding to the first ML model;
- determining a second set of weights $w_2$ corresponding to the second ML model; and
- generating a continuous piece-wise smooth parametric curve $\phi_\theta(t)$ with parameters $\theta$ such that $\phi_\theta(0)=w_1$ and $\phi_\theta(1)=w_2$.

20. The system of claim 19, wherein generating the continuous piece-wise smooth parametric curve comprises determining the parameters $\theta$, comprising:
- minimizing expectation over a uniform distribution on a curve defined by $L(\theta)=E_{t\sim U(0,1)}(l(\phi_\theta(t)))$.

* * * * *